United States Patent [19]

Juguin et al.

[11] Patent Number: 4,902,847
[45] Date of Patent: Feb. 20, 1990

[54] METHOD FOR PRODUCING OLEFIN OLIGOMERS USING A MODIFIED MORDENITE BASED CATALYST

[75] Inventors: Bernard Juguin; Francis Raatz; Christine Travers, all of Rueil-Malmaison; Germain Martino, Poissy, all of France

[73] Assignee: Institut Francais Du Petrole, Rueil-Malmaison, France

[21] Appl. No.: 245,241

[22] Filed: Sep. 16, 1988

[30] Foreign Application Priority Data

Sep. 17, 1987 [FR] France .................................. 87 12932

[51] Int. Cl.$^4$ ............................................... C07C 2/02
[52] U.S. Cl. .................................................... 585/533

[58] Field of Search ........................................ 585/533

[56] References Cited

U.S. PATENT DOCUMENTS 3,591,488  6/1969  Eberly, Jr. et al. .
4,454,367  6/1984  Sakurada et al. .................. 585/533

*Primary Examiner*—Curtis R. Davis
*Attorney, Agent, or Firm*—Millen, White & Zelano

[57] ABSTRACT

Preparation of oligomers of $C_2$ to $C_8$ olefins useful in gasoline, yet fuel and diesel fuel is disclosed. The oligomerization is catalyzed by a modified mordenite in the H or $NH_4+$ to form which has been sequentially treated with steam and an acid.

17 Claims, No Drawings

METHOD FOR PRODUCING OLEFIN OLIGOMERS USING A MODIFIED MORDENITE BASED CATALYST

The present invention relates to a method for producing olefin oligomers. It enables, for example, the production of premium grade gasoline, jet fuel and automobile diesel oil, from $C_2$ to $C_8$ light olefins.

The starting olefins may be derived from any suitable source. They can, also, be produced by conversion of methanol.

The method according to the invention is adapted, in particular, for refiners and/or petroleum chemists who have or can have available a supply of methanol on the one hand, and on the other hand, one or several $C_2$ to $C_8$ light olefin production units, like, for example, installations for catalytic cracking, for steamcracking or catalytic dehydrogenation.

The method according to the invention enables, in particular, the production of:

(1) premium grade gasoline of high quality,
(2) fuel of excellent quality for jet engines,
(3) fuel oil of very good quality for diesel engines.

The method according to the invention is applicable particularly in the following cases:

(a) the fresh charge is constituted only by methanol which, in the first place, is sent into a catalytic decomposition zone where it is converted into water and into light olefins constituted principally of propene, then, in the second place, after separation of the water formed, the light olefins are sent into an oligomerization zone where they are converted into a mixture of premium gasoline and bases for jet fuel and diesel oil.

(b) the fresh charge is constituted only of $C_2$ to $C_8$ light olefins coming either from a catalytic cracking unit, or from a steamcracking unit, or from a catalytic dehydrogenation unit, or from any other source of supply; this fresh charge is then sent directly into the oligomerization section where it is converted into a mixture of premium gasoline and bases for jet fuel and diesel fuel.

(c) the fresh charge is constituted by a mixture of the two preceding charges.

In the so-called zone of catalytic decomposition, the conversion of the methanol into water and into light olefins is effected in the vapor phase in the presence of an acid zeolitic catalyst operating either in a fixed bed, or preferably in a fluidized catalytic system, at a temperature of about 450° to 650° C. (preferably between 530° and 590° C.), at a pressure of 0.01 to 1 MPa (preferably from 0.05 to 0.5 MPa), with a liquid charge flow rate (space velocity) of about 5 to 100 volumes per volume of catalyst and per hour, the charge being composed either of pure methanol, or of a mixture in any proportion of steam and methanol.

The so-called oligomerization reaction is carried out in the liquid phase, in the supercritical phase and in the gaseous phase, in the presence of an acid zeolite catalyst provided in the form of a fixed bed at a temperature of about 50° to 400° C. (preferably between 150° and 300° C.), at a pressure of 2 to 10 MPa (preferably between 3 and 7 MPa), with a liquid hydrocarbon flow rate (space velocity) of about 0.3 to 4 volumes per volume of catalyst and per hour.

The catalyst used for the reactions of conversion of methanol into olefins and oligomerization of the light olefins are constituted of modified H form mordenites. However, the characteristics of the catalytic phases are optimized for each type of reaction.

For the reaction of conversion of the methanol into light olefins, it is possible to use the catalytic systems known in the prior art, and described in detail in the patents EP No. 0084748 and U.S. Pat. No. 4,447,669. The H form mordenite has, in this case, an Si/Al ratio higher than 80 and, preferably, comprised between 100 and 150. These high Si/Al ratios are obtained by a dealuminization procedure relying upon an alternation of calcination in steam and acid treatments. The steam contents selected for the calcinations are less than 60%, the treatment temperatures being comprised between 550° and 680° C. The acid attacks are carried out in concentrated acid solutions between 2 and 9N. It is to be noted that the use of dealuminized mordenite is preferable to that of zeolites of the MF1 type recommended by the MOBIL OIL company ("methanol conversion to light olefins" by Clarence D. CHANG, Catal. Rev. Sci. Eng. 26 (3 and 4) 323–345, 1984), since mordenite leads to higher yields of propylene and butenes. The low proportion of ethylene obtained with mordenite is an important point, since this enables the yields of diesel oil and jet fuel in the course of the second oligomerization step of the olefins, to be increased.

The use of zeolites in the H form for the oligomerization reaction of the light olefins $C_2$ to $C_8$ has been proposed by numerous authors (U.S. Pat. Nos. 4,487,985, 4,513,156, 4,417,086, 4,424,423, 4,417,088 and 4,423,268—M. OCCELLI, J, HSU and L. GALYA in J. Mol. Catal. 32, 1985, 377). According to the prior art, the zeolites which can be effective for this oligomerization reaction must correspond to very strict criteria. Two principal criteria have been defined: the constraint index (CI) of the MOBIL QIL company, and the hydrogen transfer index (HTI) of the CHEVRON company.

The constraint index CI normally enables the geometric selectivity properties of the zeolites to be characterized.

It is defined in detail in the document U.S. Pat. No. 4,324,940; it is, in fact, an approximate measurement of the relative cracking velocity of n-hexane and 3-methylpentane. By using the CI as criterion of selection of zeolites which can have advantageous properties in oligomerization of olefins, it is necessary, according to the prior art, for it to be in a zone comprised between 2 and 12 (U.S. Pat. Nos. 4,323,940, 4,487,985 and 4,513,156). The selected zeolites are then principally the following: ZSM 5, ZSM 11, ZSM 23, ZSM 37. These zeolites are characterized essentially by pores with 10 oxygen apertures. In fact, the most open zeolites (pores of 12 oxygen apertures) like mordenite, ZSM 4, zeolite Y, beta zeolite, have very low CIs ($<<1$) (U.S. Pat. No. 4,324,940). Thus, it appears, according to the prior art, that 10 oxygen apertures proved to be necessary for the oligomerization reaction of olefins, excluding the most open zeolites like mordenite. In fact, standard H form mordenite (zeolon 900 H) results in mediocre performance (M. OCCELLI, J. HSU and L. GALYA, J. Mol. Catal. 32 (1985), 377).

The second criterion, which has been defined to select zeolites which can be effective in oligomerization, is the hydrogen transfer index (HTI). Its detailed definition is given in the document U.S. Pat. No. 4,417,086. The HTI is defined as the ratio of the amounts of 3-methylpentene and of 3-methylpentane produced from n-hexene for conversions comprised between 30 and 70%. According to this criterion, it is necessary to select only zeolites whose HTI is higher than 10 and preferably than 25 (U.S. Pat. Nos. 4,417,086, 4,414,423 and 4,417,088). ZMS 5, with an HTI higher than 60, appears again as a material of choice. Mordenite, even dealuminized, with an HTI of only 1, is to be excluded; in fact, according to this criterion, it appears even less effective than amorphous silica-alumina (U.S. Pat. Nos. 4,417,088 and 4,417,086).

Finally, whether one selects one or other of the performance criteria CI or HTI for the oligomerization reaction of olefins, mordenite, dealuminized or not, is a material not showing any or very little promise.

Dealuminized mordenite, according to a particular procedure, has however been proposed for a very special oligomerization reaction of olefins: the selective oligomerization of isobutene in a hydrocarbon mixture containing other olefins, in particular butenes 1 and 2, the latter not having to be converted (U.S. Pat. Nos. 4,513,166 and 4,454,367). It is well-known that the conversion of isobutene by oligomerization is a very easy reaction which does not require strong acidity; it can, besides, be very satisfactorily carried out on amorphous silica-alumina, under operational conditions which are hardly rigorous (U.S. Pat. Nos. 4,268,700, 4,324,938, 4,392,002, 4,423,264, EP No. 132172, FR No. 2,498,306, FR No. 2,495,605, FR No. 2,517,668 and FR No. 2,508,899).

As will be seen in the examples, a modified mordenite, according to a procedure different from that of the invention, can oligomerize isobutene without necessarily oligomerizing the other olefins present in the charge. According to the documents U.S. Pat. Nos. 4,513,166 and 4,454,367, dealuminized mordenites permitting selective conversion of the isobutene have Si/Al ratios varying between 50 and 200, a pyridine retention capacity at the temperature of 300° C. of 0.05 to 0.25 millimole per gram$^{-1}$, and are prepared by calcination cycles under steam-acid attack. The calcination is imperatively carried out at a temperature higher than 600° C. at a partial pressure of steam less than 50%, and the acid attack in a solution of concentration higher than 4N. It is, besides, distinctly preferably to proceed, after the calcination cycles is steam (% $H_2O$ <50%)-acid attack with a subsequent calcination between 400° and 700° C. so as to stabilize the solid better. Dealuminized mordenites, according to the method thus described, proved to be poor catalysts for the oligomerization of light olefins, in order to obtain bases for diesel fuels and/or jet fuels. This is probably due to two factors: on the one hand, their unoptimized acidity, that is to say very low and, on the other hand, their imperfect crystalline organization. In fact, it is known that pyridine is too strong a base and hence insufficiently selective. It is adsorbed on all of the acid sites present in the modified zeolites, whether they are of Bronsted type or of the Lewis type. The measurement of the amount of pyridine, remaining adsorbed at 300° C. on a zeolite, gives access to the total amount of acid sites present on the surface of the solid, but does not give any accurate indication on the type of acid site (Bronsted or Lewis), and on their distribution in strength. Under these conditions, pyridine does not discriminate between sites of average strength from strong sites. In addition, it has been shown that the acid attack which follows calcination under steam of a zeolite (A. MACEDO, F. RAATZ, R. BOULET, E. FREUND, Ch. MARCILLY, Preprints of Poster Papers, the 7the International Zeolite Conference, Tokyo, July 1986), must be carefully optimized so that the cationic alumina which can be formed in the course of this calcination and which is a specific poison of the strong sites of the lattice, is eliminated. In addition, for an identical Si/Al ratio, a well-crystallized zeolite shows stronger acidity than the same solid whose lattice is less well organized.

In addition, the U.S. Pat. No. 3,591,488 teaches a hydrocarbon conversion method in which there is used mordenite prepared by a heat treatment step in the presence of steam under severe conditions, followed by an acid attack in a dilute medium (0.1N in Example 4). It is observed that mordenite so treated has little activity in the oligomerization of olefins.

Finally, patents FR No. 2,477,903 and U.S. Pat. No. 3,597,155 illustrate the prior art.

In the uses aimed at by the present invention, it is preferred to convert by oligomerization all of the olefins present in the charge ($C_2$ to $C_8$). It is no longer, as in the preceding applications (U.S. Pat. Nos. 4,454,367 and 4,513,166) a matter of oligomerizing isobutene selectively. From this point of view, it is known that the velocities of oligomerization of light olefins vary in the sense: V isobutene>V propene>V butene-1 and pentene-1>>V butenes-2>V ethylene.

Thus, to convert all of the $C_2$ to $C_8$ olefins, it is necessary to have available a catalyst whose acidity is strong. In the present invention, it has been discovered that a zeolite which is not selective geometrically (poor CI and HTI indices), that is to say of a 12-oxygen pore opening: H form mordenite, suitably modified, permits the preparation of oligomerization catalysts for light olefins which are extremely effective, and even better than those prepared from zeolites with 10-oxygen pore openings (indices CI and HTI comprised within the ranges recommended in the prior art). The particular procedure of dealuminization which has been used enables, on the one hand, a strong acidity and, on the other hand, an excellent crystalline organization, to be attained.

Mordenites useable as basic materials may be of natural or synthetic origin. It is preferred, however, to use synthetic zeolites, since they can be prepared in a very pure phase with a controlled Si/Al ratio, varying generally between 5 and 25, and more specifically between 5 and 15. If the starting mordenite contains organic structurizing agents, they are eliminated before any treatment by calcination in the presence of oxygen at 550° C., for example, or by any other technique known in the prior art. To arrive at the dealuminized H form, it is necessary, in the first stage, to remove the non-decomposable cations, generally $Na^+$, present in the starting mordenite. To do this, one or more exchanges can follow in dilute solutions of acids like HCl or in solutions of $NH_4^+$. The important point is, that at the end of this first step which may be qualified as decationization, almost all of the alkaline cations are removed (% Na comprised between 150 and 1000 ppm, and preferably between 300 and 800 ppm), and that the solid obtained is an H form or an H form precursor (example $NH_4^+$) not substantially dealuminized (% of dealuminization < 10% and preferably < 5%). Preferably, H form precursor is selected, and $NH_4^+$ form; in fact, the exchange $Na^+\rightleftharpoons NH_4^+$ does not result in dealuminization of the lattice. The latter is therefore in an $NH_4$ form obtained by exchange, normally free from structural defects.

In a first step, the H form or the H form precursor, a little dealuminized or not dealuminized, at all is subjected to a treatment under steam at a temperature higher than 450° C. and, preferably, 550° to 600° C., under a partial pressure of steam higher than 60% and, preferably 85%. The high steam partial pressure is an essential criterion of the preparation, since this high pressure leads to solids whose well dealuminized lattice is very well recrystallized: it contains few defects. Without binding oneself to a particular theory, it can be assumed that a high steam partial pressure facilitates the migration of the silica, coming from the amorphized zones, and its subsequent reinsertion in the gaps of the lattice left vacant by the departure of the aluminum. At the end of this second step, a solid is obtained characterized by the presence of a small amount of amorphous zones which are precursors of the secondary porous network, and by a crystalline lattice practically free from structural defects. The presence of amorphous zones, in zeolites treated at high temperature under steam, is a known phenomenon. However, the recommended operational conditions enable the proportion of amorphous zone in the heart of the crystals to be limited to the maximum. The ratios of crystallinity measured by X-ray diffraction are generally greater than 80% and, more specifically, than 90%. The solids calcined under steam are also characterized by the presence, in the structural micropores, of extra lattice alumina species, a subsequent acid treatment is hence necessary, since these micropores are practically clogged. However, to obtain a good oligomerization catalyst, this acid attack must be optimized.

The optimized acid attack constitutes the third step in the preparation of the catalysts. At this stage, it is important to preserve or to release the strong acid sites of the solids. The acid attack must therefore be sufficiently strong, in order on the one hand, to remove the cationic aluminums formed during the steam treatment, which cationic species are poisons of the strong sites, and on the other hand, to free the structural microporosity. The acid sites of the Bronsted type connected with the extra lattice species being of average or low strength, it is not indispensable to proceed with their complete elimination. The acid attack must not be, however, too strong, so as to avoid too considerable a dealuminization of the lattice aluminum. The strength to be selected for each acid attack depends strictly on the characteristics attained after calcination under steam and, in particular, on the crystalline mesh.

The concentrated solutions are generally used at a concentration comprised between 0.5N and 20N and preferably between 1 and 12N.

The $pK_A$ of the recommended acids is customarily less than 4 and preferably than $-1.5$.

The volume of solution used, expressed in cm$^3$, on the weight of dry solid at 100° C. expressed in grams (V/P) is generally higher than 3 and preferably comprised between 5 and 10.

The duration of the acid treatment is generally greater than 10 minutes and preferably varies between 1 and 4 hours.

For lattice Si/Al ratios varying between 10 and 40, there will be used concentrations of acid solutions (HCl, $H_2SO_4$, $HNO_3$, etc . . .) comprised between 0.5 and 5N and, preferably, between 1 and 3N. For higher lattice Si/Al ratios, there will be used concentrations of acid solutions comprised between 5 and 20N and preferably between 7 and 12N (the lattice Si/Al ratios are determined by infra-red spectroscopy for ratios comprised between 10 and 40, and by N.M.R. of the $^{29}$Si for higher ratios). It is possible to perform, instead of one attack in a concentrated medium, several attacks in a dilute medium; the ranges of operational conditions given above illustrate simply the case where a single post-calcination acid attack is performed, without limiting, however, the scope of the invention. In addition, to achieve high Si/Al ratios, that is to say higher than 40 and more specifically higher than 60, recourse will advantageously be had to several calcination cycles under optimized steam-acid attack. It is important for the acid attack not to be too severe, since there is, under these conditions, dealuminization of the lattice without recrystallization and, therefore, formation of atomic gaps which are points of fragilization of the structure.

The solids prepared according to the invention have advantageously Si/Al ratios varying between 10 and 100 and, preferably, between 20 and 60; they have a mesh volume located between 2755 A$^3$ and 2730 A$^3$ (1 A = 10$^{-10}$m) and preferably between 2745 A$^3$ and 2735 A$^3$, they have preferably a sufficient acid strength for the structural Al—OHs to interact with a weak base like ethylene (infra-red measurement at 77° K.), or a compound with weakly acid character like H$_2$S (infra-red measurement at 25° C.). These solids must, in addition, be free from extra lattice cationic species which it is possible to detect by an end signal (half height width less than 5 ppm and preferably less than 2 ppm) situated at 0 ppm (Al(H$_2$O)$_6^{3+}$) on a N.M.R. spectrum of $27_{Al}$, measured with the rotation technique of the magic angle.

The following examples, which are not limiting, illustrate the invention.

Example 1A

Seven catalysts B1, B2, B3, B4, B5, B6 and B7 are prepared according to the invention.

The raw materials used to prepare these various catalysts is a small pore mordenite of the Societe Chimique de la Grande Paroisse, referenced Alite 150; its chemical formula in the anhydrous condition is Na,AlO$_2$(SiO$_2$)$_{5,5}$, its adsorption capacity for benzene is 1% by weight with respect to the weight of dry solid, and its sodium content 5.3% by weight. Five hundred grams of this powder are immersed in a 2M ammonium nitrate solution, and the suspension is brought to 95° C. for 2 hours. The volume of the ammonium nitrate solution involved is equal to 4 times the weight of dry zeolite (V/P=4). This cationic exchange operation is recommended 3 times. After the 3rd exchange, the product is washed with water at 20° C. for 20 minutes, with a V/P ratio equal to 4. The content of sodium expressed in percentage by weight with respect to the dry zeolite passes from 5.5 to 0.2%. The product is then filtered, and different batches are subjected to calcination in a confined atmosphere, at a more or less high temperature according to the degree of dealuminization of the lattice that it is desired to obtain (Table I). The duration of calcination is fixed at 2 hours. The partial steam pressure within the reactor is of the order of 90%. The crystallinity of the different solids, after this calcination step, is greater than or equal to 90%.

There follows then, on each of the solids, an acid attack with nitric acid of a concentration which is higher as the dealuminization ratio of the lattice obtained, in the preceding step, is greater (Table I). In the course of the acid attack, the solid is brought to reflux in the nitric acid solution for two hours, with a V/P ratio equal to 8. The product is then filtered, then washed abundantly with distilled water.

The Si/Al atomic ratios obtained for each of the solids are shown in Table I.

Each modified solid is then placed in form by malaxation with a binder of the alumina type, in the proportion of 20% by weight of binder, then passage through a die. The extrudates obtained, of diameter 1.2 mm, are then dried and calcined between 150° and 500° C. by stages of about one hour.

The B7 catalyst, of overall Si/Al ratio=115, is obtained by performing a second calcination-acid attack cycle at a temperature of 650° C. with a 10N nitric acid solution, on the B6 catalyst.

TABLE I

| Catalyst | B1 | B2 | B3 | B4 | B5 | B6 |
|---|---|---|---|---|---|---|
| Calcination Temperature (°C.) | 500 | 520 | 530 | 550 | 570 | 600 |
| Overall Si/Al atomic ratio* | 5.5 | 5.5 | 5.5 | 5.5 | 5.5 | 5.5 |
| Atomic ratio Si/Al IV of the lattice structure | 9 | 16 | 23 | 38 | 57 | 86 |
| Normality of the nitric acid solution | 1 N | 1.3 N | 2 N | 3 N | 7 N | 10 N |
| Overall Si/Al atomic ratio** | 9 | 16 | 23 | 38 | 57 | 86 |

*after calcination
**after acid attack

EXAMPLE 1B

Seven catalysts B'1, B'2, B'3, B'4, B'5, B'6 and B'7 according to the invention were prepared.

These catalysts differ from those described in Example 1A in that the raw material used to prepare them is no longer mordenite Alite 150 of the Societe Chimique de la Grande Paroisse, but a large pore mordenite of the TOYO-SODA company, referenced TSZ 600 NAA. Its chemical formula, in the anhydrous condition, is: Na,AlO$_2$(SiO$_2$) 5,1, and its sodium content 5.7%.

All the steps of exchange, calcination, acid attack, shaping and calcination, are carried out under the same conditions as those described in Example 1A. The atomic ratios Si/Al obtained are only very slightly different (Table II).

TABLE II

| Catalyst | B'1 | B'2 | B'3 | B'4 | B'5 | B'6 |
|---|---|---|---|---|---|---|
| Calcination Temperature (°C.) | 500 | 520 | 530 | 550 | 570 | 600 |
| Overall Si/Al atomic ratio* | 5.1 | 5.1 | 5.1 | 5.1 | 5.1 | 5.1 |
| Atomic ratio Si/Al IV of the lattice structure | 8 | 14 | 20 | 36 | 55 | 83 |
| Normality of the nitric acid solution | 1 N | 1.3 N | 2 N | 3 N | 7 N | 10 N |
| Overall Si/Al atomic ratio** | 8 | 14 | 20 | 36 | 55 | 83 |

*after calcination
**after acid attack

The B'7 catalyst of ratio Si/Al=110 is obtained by carrying out a second calcination-acid attack cycle, at a temperature of 650° C., with a 10N nitric acid solution on the B'6 catalyst.

EXAMPLE 2A

The seven catalysts B1, B2, B3, B4, B5, B6 and B7, described in Example 1A, were tested by oligomerization of a C$_3$ cut from steamcracking, in order to obtain a maximum of base for jet fuel and diesel fuel.

The operational conditions were as follows:
temperature: 210° C.
pressure: 5.5 MPa
hourly flow rate of liquid charge equal to 0.7 times the volume of catalyst.

The charge had the following composition by weight:

| | |
|---|---|
| propane | 5.22% |
| propene | 94.20% |
| isobutane | 0.16% |
| n-butane | 0.10% |
| butene-1 | 0.08% |
| isobutene | 0.16% |
| butenes-2 | 0.08% |
| | 100 |

At the outlet of the reactor, the products had respectively the compositions by weight shown in Table III.

TABLE III

| Constituents | B1 | B2 | B3 | B4 | B5 | B6 | B7 |
|---|---|---|---|---|---|---|---|
| methane | — | — | — | — | — | — | — |
| ethane | 0.02 | 0.01 | — | — | — | 0.01 | 0.02 |
| propane | 10.82 | 11.89 | 10.38 | 9.56 | 8.62 | 7.88 | 6.81 |
| propene | 49.27 | 22.70 | 5.18 | 2.07 | 7.25 | 18.27 | 27.41 |
| isobutane | 0.88 | 1.43 | 1.24 | 0.71 | 0.60 | 0.46 | 0.66 |
| n-butane | 0.11 | 0.54 | 0.11 | 0.10 | 0.10 | 0.10 | 0.13 |
| butene-1 | 0.03 | 0.01 | 0.01 | — | 0.01 | 0.01 | 0.01 |
| isobutene | 0.02 | — | — | — | — | — | 0.01 |
| butenes-2 | 0.06 | 0.05 | 0.04 | 0.03 | 0.05 | 0.05 | 0.06 |
| oligomers C$_5^+$ | 38.79 | 63.37 | 83.04 | 87.53 | 83.37 | 73.22 | 64.89 |
| | 100 | 100 | 100 | 100 | 100 | 100 | 100 |

The various C$_5^+$ oligomers had the characteristics shown in Table IV.

Within the scope of the catalyst prepared according to the invention, it can be noted that it is preferable to work with dealuminized mordenites having an Si/Al ratio comprised between 20 and 60, since:

(1) the activity of the catalyst is greater and leads to very high yields of C$_5^+$ oligomers (83 to 88% in Table III).

(2) the yield of diesel cut > 180° C. is also highest in the preferred range as well as the characteristics of this diesel fraction after hydrogenation, in particular the cetane number.

TABLE IV

| Charact. | Catal. | | | | | | |
| | B1 | B2 | B3 | B4 | B5 | B6 | B7 |
|---|---|---|---|---|---|---|---|
| OVERALL OLIGOMER C$_5^+$ | | | | | | | |
| density 20° C. | 0.785 | 0.790 | 0.797 | 0.803 | 0.799 | 0.787 | 0.772 |
| bromine number gasoline cut PI-180° C. | 71 | 68 | 62 | 58 | 60 | 70 | 83 |

TABLE IV-continued

| Charact. | B1 | B2 | B3 | B4 | B5 | B6 | B7 |
|---|---|---|---|---|---|---|---|
| (% wt) diesel cut >180° C. | 31 | 28 | 24 | 20 | 23 | 33 | 49 |
| (% wt) DIESEL CUT >180° C. AFTER HYDROGENATION | 69 | 72 | 76 | 80 | 77 | 67 | 51 |
| bromine number | 0.4 | 0.5 | 0.3 | 0.4 | 0.3 | 0.6 | 0.5 |
| cloud point (°C.) | <−50 | <−50 | <−50 | <−50 | <−50 | <−50 | <−50 |
| smoke point (cut 180–300° C.) (mm) | 31 | 32 | 33 | 33 | 33 | 33 | 33 |
| cetane number | 39 | 41 | 42 | 43 | 43 | 41 | 37 |
| GASOLINE CUT PI–180° C. octane number | | | | | | | |
| RON | 96 | 96 | 96 | 96 | 96 | 96 | 96 |
| MON | 83 | 83 | 83 | 83 | 83 | 83 | 83 |

EXAMPLE 2B

The seven catalysts B'1, B'2, B'3, B'4, B'5, B'6 and B'7, described in Example 1b were tested in oligomerization of the $C_3$ cut from steamcracking whose composition by weight is given in Example 2A. The operational conditions were the same as in Example 2A.

On emerging from the reactor, the products had respectively the compositions by weight shown in Table V.

TABLE V

| Constituents | B'1 | B'2 | B'3 | B'4 | B'5 | B'6 | B'7 |
|---|---|---|---|---|---|---|---|
| methane | — | — | — | — | — | — | — |
| ethane | 0.02 | 0.01 | — | — | — | — | 0.02 |
| propane | 10.34 | 11.95 | 10.45 | 9.66 | 8.72 | 7.97 | 6.92 |
| propene | 53.69 | 28.73 | 11.96 | 2.17 | 6.22 | 17.33 | 25.81 |
| isobutane | 0.82 | 1.44 | 1.16 | 0.72 | 0.61 | 0.48 | 0.69 |
| n-butane | 0.11 | 0.54 | 0.18 | 0.10 | 0.10 | 0.10 | 0.13 |
| butene-1 | 0.03 | 0.01 | 0.01 | — | 0.01 | 0.01 | 0.01 |
| isobutene | 0.02 | 0.01 | — | — | — | — | 0.01 |
| butenes-2 | 0.07 | 0.06 | 0.05 | 0.03 | 0.04 | 0.05 | 0.06 |
| oligomers $C_5^+$ | 34.90 | 57.25 | 76.19 | 87.32 | 84.30 | 74.06 | 66.35 |
| | 100 | 100 | 100 | 100 | 100 | 100 | 100 |

The various $C_5^+$ oligomers had the characteristics shown in Table VI.

TABLE VI

| Charact. | B'1 | B'2 | B'3 | B'4 | B'5 | B'6 | B'7 |
|---|---|---|---|---|---|---|---|
| OVERALL OLIGOMER $C_5^+$ | | | | | | | |
| density 20° C. | 0.784 | 0.788 | 0.794 | 0.803 | 0.800 | 0.789 | 0.775 |
| bromine number | 71 | 69 | 64 | 58 | 59 | 69 | 81 |
| gasoline cut PI–180° C. | | | | | | | |
| (% wt) diesel cut >180° C. | 31 | 29 | 26 | 20 | 22 | 32 | 46 |
| (% wt) DIESEL CUT >180° C. AFTER HYDROGENATION | 69 | 71 | 74 | 80 | 78 | 68 | 54 |
| bromine number | 0.5 | 0.3 | 0.4 | 0.5 | 0.6 | 0.3 | 0.5 |
| cloud point (°C.) | <−50 | <−50 | <−50 | <−50 | <−50 | <−50 | <−50 |
| smoke point (cut 180–300° C.) (mm) | 30 | 32 | 33 | 33 | 33 | 33 | 33 |
| cetane number | 39 | 41 | 42 | 43 | 43 | 41 | 38 |
| GASOLINE CUT PI–180° C. octane number | | | | | | | |
| RON | 96 | 96 | 96 | 96 | 96 | 96 | 96 |
| MON | 83 | 83 | 83 | 83 | 83 | 83 | 83 |

As in the case of Example 2A, it can be observed that with the catalysts prepared according to the invention, it is preferable to work with dealuminized mordenites having an Si/Al ratio comprised between 20 and 60.

EXAMPLE 2C (comparative)

By way of comparison, three catalysts based on mordenite were prepared, by the method described in documents U.S. Pat. Nos. 4,513,166 and 4,454,367, operating with a partial steam pressure of 30%, that is to say by using a technique different from that recommended by the present invention.

The catalyst C1 had an Si/Al ratio=53 and a pyridine retention capacity equal to 0.07 millimole per g at the temperature of 300° C.

The catalyst C2 had an Si/Al ratio=97 and a pyridine retention capacity equal to 0.14 millimole per g at the temperature of 300° C.

The catalyst C3 had an Si/Al ratio=155 and a pyridine retention capacity equal to 0.22 millimole per g at the temperature of 300° C.

These three catalysts were used to try to oligomerize the $C_3$ cut from steamcracking whose composition is given in Example 2A.

The operational conditions were identical with those of Example 2A.

At the outlet of the reactor, the products had respectively the compositions by weight shown in Table VII.

TABLE VII

| Constituents | Catalysts | | |
|---|---|---|---|
| | C1 | C2 | C3 |
| methane | 0.86 | 0.49 | 0.18 |
| ethane | 0.46 | 0.24 | 0.07 |
| propane | 15.17 | 10.89 | 7.28 |
| propene | 73.32 | 78.16 | 83.87 |
| isobutane | 2.44 | 1.46 | 0.63 |
| n-butane | 0.39 | 0.26 | 0.16 |
| butene-1 | 0.01 | 0.01 | 0.02 |
| isobutene | — | — | 0.01 |
| butenes-2 | 0.29 | 0.16 | 0.12 |
| butadiene 1.3 | 0.38 | 0.24 | 0.09 |
| oligomers $C_5^+$ | 6.68 | 8.09 | 7.57 |
| | 100 | 100 | 100 |

It can be noted that this type of catalyst is poorly adapted for the oligomerization of propene; it is at the same time hardly active and hardly selective, there is a considerable formation of by-products, in particular of propane, isobutane, methane and 1,3 butadiene. In addition, it could be observed that the activity of these catalysts diminished very rapidly due to the fact of the very considerable formation of coke.

EXAMPLE 2D (comparative)

Preparation of an HM dealuminized for not according to the invention.

As starting material large pore mordenite from the TOYO SODA company in a form reference TSZ 600 NAA. The chemical formula of this solid in the anhydrous state is Na, $AlO_2 (SiO_2)_{5,1}$. This solid is in a first stage subjected to three successive exchange in $NH_4NO_3$ 5N at 90° C. for 2 hours by using ratios (volume of solution/weight of solid) equal to 4 cm$^3$/g. After the exchanges the product was washed, filtered then dried. Its sodium content was then less than 600 ppm.

The $NH_4M$ form so obtained was then subjected to calcination under 80% steam at 590° C. for 4 hours, then to an acid attack in $HNO_3$ under the following conditions:

| | |
|---|---|
| $HNO_3$ | 0.15 N |
| Duration | 3 hours |
| Solution volume/solid weight | 4 cm$^3$/g |
| Temperature | 90° C. |

At the end of this dealuminization procedure the Si/Al ratio of the HM form obtained was equal to 8.0.

The HM form thus prepared was tested in oligomerization of a C3 cut from steamcracking in order to obtain a maximum of base for jet fuel and diesel fuel.

The operational conditions and the composition of the charge were those of Example 2A.

At the outlet of the reactor, the products had respectively the following compositions by weight:

| | |
|---|---|
| methane | — |
| ethane | 0.02 |
| propane | 9.55 |
| propene | 63.13 |
| isobutane | 0.76 |
| n-butane | 0.10 |
| butene-1 | 0.04 |
| isobutene | 0.03 |
| butenes-2 | 0.09 |
| Oligomers $C_5^+$ | 26.28 |
| total | 100.00 |

The $C_5^+$ oligomer had the following characteristics:

| (1) Overall $C_5^+$ oligomer | |
|---|---|
| density at 20° C. | 0.773 |
| bromine number | 73 |
| yield of gasoline cut PI–180° C.: % weight | 38% |
| yield of diesel fuel cut >180° C.: weight | 62% |
| (2) Diesel cut >180° C. after hydrogenation | |
| bromine number | 0.4 |
| cloud point | <−50° C. |
| smoke point (cut 180–300° C.) | 28 mm |
| cetane number | 37 |
| (3) Gasoline cut PI–180° C. | |
| octane numbers | |
| RON | 96 |
| MON | 83 |

This catalyst prepared according to acid attack conditions not according to the invention is hence of little activity.

EXAMPLE 3A

The catalysts B3, B4, and B5 of example 1A were used to oligomerize a $C_4$ cut from steamcracking, in order to obtain a maximum of base for gasoline and diesel fuel.

This charge had the following composition by weight:

| | |
|---|---|
| propene | 0.06% |
| isobutane | 1.57% |
| n-butane | 8.92% |
| butene-1 | 24.36% |
| isobutene | 43.55% |
| butenes-2 | 21.48% |
| butadiene 1.3 | 0.06% |

The operation conditions were as follows:
temperature: 230° C.

pressure: 5.5 MPa
hourly flow rate of liquid charge equal to 0.7 times the volume of the catalyst.

At the outlet of the reactor, the products had respectively the compositions by weight shown in Table VIII.

TABLE VIII

| Constituents | Catalysts | | |
|---|---|---|---|
| | B3 | B4 | B6 |
| methane | — | — | — |
| ethane | — | — | — |
| propane | 0.16 | 0.17 | 0.12 |
| propene | 0.08 | 0.09 | 0.06 |
| isobutane | 5.26 | 4.89 | 4.36 |
| n-butane | 13.92 | 13.43 | 12.70 |
| butene-1 | 0.97 | 0.29 | 1.44 |
| isobutene | 0.61 | 0.50 | 0.69 |
| butenes-2 | 5.97 | 3.44 | 8.81 |
| butadiene 1.3 | — | — | — |
| oligomers $C_5^+$ | 73.03 | 77.19 | 71.82 |
| | 100 | 100 | 100 |

The various $C_5^+$ oligomers had the characteristics shown in Table IX.

TABLE IX

| Charact. | Catal. | | |
|---|---|---|---|
| | B3 | B4 | B5 |
| OVERALL OLIGOMER $C_5^+$ | | | |
| density 20° C. | 0.780 | 0.786 | 0.782 |
| bromine number | 68 | 65 | 66 |
| gasoline cut PI-180° C. (% wt) | 34.5 | 30 | 33 |
| diesel cut >180° C. (% wt) | 65.5 | 70 | 67 |
| DIESEL CUT >180° C. AFTER HYDROGENATION | | | |
| bromine number | 0.6 | 0.4 | 0.4 |
| cloud point (°C.) | <−50 | <−50 | <−50 |
| smoke point (cut 180–300° C. (mm) | 31 | 31 | 31 |
| cetane number | 30 | 31 | 31 |
| GASOLINE CUT PI-180° C. octane number | | | |
| RON | 99 | 98 | 99 |
| MON | 85 | 84 | 85 |

EXAMPLE 3B

By way of comparison, the catalysts C1, C2 and C3 of Example 2C were used to attempt to oligomerize the C4 cut from steamcracking those composition is given in Example 3A.

The operational conditions were identical with those of Example 3A.

At the outlet of the reactor, the products had respectively the compositions by weight shown in Table X.

TABLE X

| Constituents | Catalysts | | |
|---|---|---|---|
| | C1 | C2 | C3 |
| methane | 1.44 | 1.04 | 0.78 |
| ethane | 0.56 | 0.41 | 0.30 |
| propane | 4.69 | 3.44 | 2.52 |
| propene | 0.04 | 0.05 | 0.05 |
| isobutane | 8.86 | 6.91 | 5.48 |
| n-butane | 19.73 | 16.78 | 14.65 |
| butene-1 | 18.27 | 19.07 | 20.93 |
| isobutene | 0.44 | 0.87 | 1.74 |
| butenes-2 | 24.45 | 24.39 | 23.40 |
| butadiene 1.3 | 1.11 | 0.81 | 0.61 |
| oligomers $C_5^+$ | 20.41 | 26.23 | 29.54 |
| | 100 | 100 | 100 |

It can be observed that if this type of catalyst is suitable for the oligomerization of isobutene, which is an easy reaction, it is poorly adapted for the oligomerization of n-butenes which are very little converted. In addition, these catalysts are scarcely selective, since there is a considerable formation of by-products, in particular of n-butane, isobutane, propane, methane and 1.3 butadiene. In addition, as in the case of Example 2B, a very rapid deactivation of the catalyst is observed due to the fact of the formation of coke.

EXAMPLE 4

The catalyst B4 of Example 1A was used to oligomerize a $C_2$ cut from catalytic cracking, in order to obtain a maximum of base for gasoline and diesel fuel.

This charge had the following composition by weight:

| ethane | 4.29% |
|---|---|
| ethylene | 93.55% |
| propane | 1.36% |
| propane | 0.80% |

The operational conditions were as follows:
temperature: 280° C.
pressure: 5.5 MPa
hourly flow rate of charge (brought to the liquid state) equal to 0.5 times the volume of catalyst.

At the outlet of the reactor, the products had the following composition by weight:

| methane | 0.11% |
|---|---|
| ethane | 6.83% |
| ethylene | 5.89% |
| propane | 2.26% |
| propene | 0.41% |
| isobutane | 2.86% |
| n-butane | 0.27% |
| oligomers $C_5^+$ | 81.37% |
| | 100 |

The $C_5^+$ oligomer had the following characteristics:
bromine number: 59
density at 20° C.: 0.801
TBP distillation curve

| PI (°C.) | 38 |
|---|---|
| 50% vol. | 211 |
| PF (°C.) | 476 |

This oligomer was then, fractionated in a distillation column with 40 theoretical plates with a reflux ratio of 5/1.

The gasoline cut PI—180° C., which represented 43% by weight of the total oligomer, had a clear research octane number (RON) equal to 91.

The heavy cut >180° C., which represented 57% by weight of the overall oligomer, was then hydrogenated in the presence of a catalyst based on palladium deposited on alumina; after hydrogenation, the product had the characteristics below.

| bromine number | 0.4 |
|---|---|
| cloud point | <−50° C. |
| smoke point | 34 mm (cut 180–300° C.) |
| cetane number | 41 |

EXAMPLE 5

The catalyst B4 of Example 1A was used to oligomerize a C3 catalytic cracking cut, in order to obtain bases for gasoline and diesel fuel.

This charge had the following composition by weight:

| ethane | 0.18% |
|---|---|
| ethylene | 0.13% |
| propane | 23.75% |
| propene | 71.25% |
| isobutane | 3.10% |
| n-butane | 0.77% |
| butene-1 | 0.27% |
| isobutene | 0.55% |

The operational conditions were as follows:
temperature: 220° C.
pressure: 5.5 MPa
hourly flow rate of liquid charge equal to 0.7 times the volume of the catalyst At the outlet of the reactor, the products had the following composition by weight:

| ethane | 0.18% |
|---|---|
| ethylene | 0.07% |
| propane | 27.05% |
| propene | 1.99% |
| isobutane | 3.52% |
| n-butane | 0.77% |
| butene-1 | 0.01% |
| isobutene | — |
| oligomers C$_5$+ | 66.41% |
| | 100 |

The C$_5$+ oligomer had the following characteristics:
bromine number: 57
density at 20° C.: 0.804
TBP distillation curve

| PI (°C.) | 75 |
|---|---|
| 50% vol. | 259 |
| SP (°C.) | 494 |

This oligomer was then fractionated in a distillation column of 40 theoretical plates, with a reflux ratio of 5/1.

The gasoline cut PI—180° C. which represented 20% by weight of the total oligomer, had a clear research octane number (RON) equal to 96, and an clear motor octane number (MON) equal to 83.

The cut >180° C., which represented 80% by weight of the overall oligomer, was then hydrogenated in the presence of a catalyst based on palladium deposited on alumina; after hydrogenation the product showed the following characteristics.

| bromine number | 0.4 |
|---|---|
| cloud point | <−50° C. |
| smoke point | 33 mm (cut 180–300° C.) |
| cetane number | 43 |

EXAMPLE 6

The catalyst B4 in Example 1A was used to oligomerize a C4 cut from catalytic cracking, in order to obtain bases for gasoline and diesel fuel.

This charge had the following composition by weight:

| propane | 0.14% |
|---|---|
| propene | 0.37% |
| isobutane | 34.75% |
| n-butane | 11.93% |
| butene-1 | 9.99% |
| isobutene | 15.96% |
| butenes-2 | 26.86% |
| | 100 |

The operational conditions were as follows:
temperature: 240° C.
pressure: 5.5 MPa
hourly flow rate of liquid charge equal to 0.7 times the volume of the catalyst At the outlet of the reactor, the products had the following composition by weight:

| propane | 0.24% |
|---|---|
| propene | 0.05% |
| isobutane | 36.64% |
| n-butane | 14.50% |
| butene-1 | 0.12% |
| isobutene | 0.22% |
| butenes-2 | 4.30% |
| oligomers C$_5$+ | 43.93% |
| | 100 |

The C$_5$+ oligomer had the following characteristics:
bromine number: 64
density at 20° C.: 0.787
TBP distillation curve

| PI (°C.) | 79 |
|---|---|
| 50% vol. | 199 |
| SP (°C.) | 427 |

The oligomer was then fractionated in a distillation column with 40 theoretical plates, with a reflux ratio of 5/1.

The gasoline cut PI—180° C., which represented 31% by weight of the total oligomer, had a clear research octane number (RON) equal to 97.5 and a clear motor octane number (MON) equal to 84.

The heavy fraction >180° C., which represented 69% by weight of the overall oligomer, was then hydrogenated in the presence of a catalyst based on palladium deposited on alumina; after hydrogenation, the product had the characteristics below.

| | |
|---|---|
| bromine number | 0.3 |
| cloud point | <−50° C. |
| smoke point | 31 mm (cut 180–300° C.) |
| cetane number | 35 |

EXAMPLE 7

The B4 catalyst of Example 1A was used to oligomerize a fraction $C_3$–$C_4$ from a catalytic cracking, in order to obtain bases for jet fuel and diesel fuel.

This charge had the following composition by weight:

| | |
|---|---|
| propane | 8.3% |
| propene | 25% |
| isobutane | 23.3% |
| n-butane | 8% |
| butene-1 | 6.7% |
| isobutene | 10.7% |
| butenes-2 | 18% |
| | 100 |

The operational conditions were as follows:
temperature: 225° C.
pressure: 5,5 MPa
hourly flow rate of liquid charge equal to 0.7 times the volume of the catalyst At the outlet of the reactor, the products had the following composition by weight.

| | |
|---|---|
| propane | 9.42% |
| propene | 0.70% |
| isobutane | 24.64% |
| n-butane | 9.84% |
| butene-1 | 0.15% |
| isobutene | 0.26% |
| butenes-2 | 3.42% |
| oligomers $C_5+$ | 51.57% |
| | 100 |

The $C_5+$ oligomer had the following characteristics:
bromine number: 61
density at 20° C.: 0.794
TBP distillation curve

| | |
|---|---|
| PI (°C.) | 77 |
| 50% vol. | 225 |
| SP (°C.) | 456 |

The oligomer was then fractionated in a distillation column with 40 theoretical plates, with a reflux ratio of 5/1.

The gasoline cut PI—180° C., which represented 25.5% by weight of the total oligomer, had a clear research octane number (RON) equal to 96 and a clear motor octane number (MON) equal to 83.

The heavy fraction >180° C., which represents 74.5% by weight of the overall oligomer, was then hydrogenated in the presence of a palladium-based catalyst on alumina; after hydrogenation, the product had the following characteristics.

| | |
|---|---|
| bromine number | 0.4 |
| cloud point | <−50° C. |
| smoke point | 32 mm (cut 180–300° C.) |

| | |
|---|---|
| cetane number | 39 |

EXAMPLE 8

The catalyst B4 of Example 1A was used to oligomerize a light cut $C_5$—105° C. coming from Fischer and Tropsch synthesis, in order to obtain bases for jet fuel and diesel fuel.

This charge had the following composition by weight:

| | |
|---|---|
| propane | 0.10% |
| isobutane + n-butane | 0.30% |
| butene-1 + butenes-2 | 1.20% |
| pentanes | 3.40% |
| pentenes | 19.30% |
| hexanes | 5.20% |
| hexenes | 30.8% |
| heptanes | 3.6% |
| heptenes | 27.5% |
| octanes | 0.9% |
| octenes | 7.3% |
| benzene | 0.4% |
| | 100 |

The operational conditions were as follows:
temperature: 235° C.
pressure: 5.5 MPa
hourly flow rate of liquid charge equal to 0.7 times the volume of the catalyst At the outlet of the reactor, the products had the following composition by weight:

| | |
|---|---|
| propane | 0.10% |
| isobutane + n-butane | 0.38% |
| butenes-2 | 0.01% |
| pentanes | 4.37% |
| pentenes | 0.19% |
| hexanes | 6.65% |
| hexenes | 1.54% |
| heptanes | 4.81% |
| heptenes | 2.75% |
| octanes | 1.22% |
| octenes | 1.09% |
| benzene | 0.40% |
| oligomers $C_9+$ | 76.49% |
| | 100 |

After stabilization of the product to remove the propane and butanes, the $C_5+$ part was fractionated in a distillation column of 40 theoretical plates with a reflux ratio equal to 5/1.

The gasoline cut PI—180° C., which represented 27% by weight of the total $C_5+$ fraction, had a clear research octane number (RON) equal to 78 and a clear motor octane number (MON) equal to 74.

The heavy cut >180° C., which represented 73% by weight of the total $C_5+$ fraction, was hydrogenated in the presence of a palladium-based catalyst deposited on alumina; after hydrogenation, the product had the following characteristics:

| | |
|---|---|
| bromine number | 0.5 |
| cloud point | <−50° C. |
| smoke point | 33 mm (coupe 180–300° C.) |

| | |
|---|---|
| cetane number | 46 |

EXAMPLE 9

The catalyst B3 of Example 1A was used to oligomerize an olefin cut coming from the decomposition of methanol, in order to obtain bases for jet fuel and diesel fuel.

This charge had the following composition by weight:

| | |
|---|---|
| dimethylether | 0.16% |
| methane | 5.30% |
| ethane | 0.32% |
| ethylene | 9.71% |
| propane | 1.46% |
| propene | 54.60% |
| isobutane | 1.64% |
| n-butane | 0.41% |
| butene-1 | 3.82% |
| isobutene | 5.91% |
| butenes-2 | 9.58% |
| pentenes | 5.12% |
| hexenes | 1.97% |
| | 100 |

The operational conditions were as follows:
temperature: 210° C.
pressure: 5.5 MPa
hourly flow rate of liquid charge equal to 0.7 times the volume of the catalyst At the outlet of the reactor, the product had the following composition by weight:

| | |
|---|---|
| dimethylether | 0.13% |
| methane | 5.30% |
| ethane | 0.41% |
| ethylene | 7.19% |
| propane | 4.50% |
| propene | 3.05% |
| isobutane | 2.59% |
| n-butane | 1.02% |
| butene-1 | 0.25% |
| isobutene | 0.09% |
| butenes-2 | 5.25% |
| oligomers $C_5^+$ | 70.22% |
| | 100 |

After stabilization of the product to remove the dimethylether, methane, ethane, ethylene, propane, propene, isobutane, n-butane, butene-1, isobutene and butenes-2, the $C_5^+$ part was fractionated in a distillation column with 40 theoretical plates with a reflux ratio equal to 5/1.

The gasoline cut PI—180° C., which represented 24% by weight of the total $C_5^+$ fraction, had a clear research octane number (RON) equal to 97 and a clear motor octane number (MON) equal to 84.

The heavy fraction > 180° C., which represented 76% by weight of the total $C_5^+$ fraction, was hydrogenated in the presence of a catalyst based on the palladium deposited on alumina; after hydrogenation, the product had the following characteristics:

| | |
|---|---|
| bromine number | 0.5 |
| cloud point | < −50° C. |
| smoke point | 33 mm (cut 180–300° C.) |
| cetane number | 42 |

We claim:

1. A method for producing oligomers, in which at least one mono-olefin having 2 to 8 carbon atoms is placed in contact with a mordenite which has been obtained by the following series of operations:
   (a) subjecting non-dealuminized mordenite substantially in the H or $NH_4^+$ form to at least one treatment with steam at a temperature of 450° C. to 600° C. at a partial steam pressure above 60%, and
   (b) treating the resulting product, at least once, with an acid, said acid being used at a concentration of 0.5 and 20N.

2. A method according to claim 1, wherein a $C_3$ or $C_4$ olefin cut is treated.

3. A method according to claim 1, wherein the sequence of operations (a) and (b) is repeated at least once.

4. A method according to claim 1, wherein the mordenite in H or $NH_4^+$ form is derived from ionic exchange of a sodium mordenite of atomic ratio Si/Al of 5 to 15.

5. A method according to claim 1, wherein the steam treatment is carried out at 550°–600° C. at a partial steam pressure above 85%.

6. A method according to claim 1, wherein steps (a) and (b) are repeated until there is obtained in the final product an atomic ratio Si/Al of 20 to 60 and a mesh volume between 2755 $A^3$ and 2730 $A^3$ (1 A = $10^{-10}$ m).

7. A method according to claim 1, wherein said acid is hydrochloric acid, sulfuric acid or nitric acid.

8. A method according to claim 1, wherein said acid has a $pK_A$ value below 4.

9. A method according to claim 1, wherein said acid treatment is performed with a volume ratio of solution expressed in $cm^3$ to the weight of dry solid at 100° C. expressed as grams (V/P) higher than 3.

10. A method according to claim 1, wherein the atomic ratio Si/Al of the mordenite subsequent to treatment in (a) is 10–100.

11. A method according to claim 1, wherein the ratio of crystallinity of the mordenite is greater than 80%.

12. A method according to claim 1, wherein the ratio of crystallinity of the mordenite is greater than 90%.

13. A method according to claim 10, wherein the ratio of crystallinity of the mordenite is greater than 80%.

14. A method according to claim 1, wherein the acid concentration is 0.5–5N where the atomic ratio Si/Al of the product of step (a) is 10–40 and 5–20N where the ratio is greater than 40.

15. A method according to claim 13, wherein the acid concentration is 0.5–5N where the atomic ratio of Si/Al of the product of step (a) is 10–40 and 5–20N where the ratio is greater than 40.

16. A method according to claim 2, wherein the olefin cut contains normal olefins, whereby said normal olefins are oligomerized.

17. A process for the preparation of a mordenite catalyst, comprising:
   (a) subjecting non-dealuminized mordenite substantially in the H or $NH_4^+$ form to at least one treatment with steam at a temperature of 450° C. to 600° C. at a partial steam pressure above 60%, and
   (b) treating the resulting product, at least once, with an acid, said acid being used at a concentration of 0.5 and 20N.

* * * * *